US006878929B2

(12) United States Patent
Green et al.

(10) Patent No.: US 6,878,929 B2
(45) Date of Patent: Apr. 12, 2005

(54) MASS SPECTROMETER AND METHODS OF MASS SPECTROMETRY

(75) Inventors: Martin Green, Altrincham (GB); Michael Jackson, Warrington (GB)

(73) Assignee: Micromass UK Limited, Manchester (GB)

( * ) Notice: Subject to any disclaimer, the term of this patent is extended or adjusted under 35 U.S.C. 154(b) by 339 days.

(21) Appl. No.: 09/823,992

(22) Filed: Apr. 3, 2001

(65) Prior Publication Data

US 2002/0063205 A1 May 30, 2002

(30) Foreign Application Priority Data

Nov. 29, 2000 (GB) ............................................. 0029040

(51) Int. Cl.[7] ............................. G01K 1/08; H01J 3/14; H01J 3/26

(52) U.S. Cl. ....................... 250/281; 250/282; 250/287; 250/292; 250/396 R; 250/397

(58) Field of Search ................................ 250/281, 282, 250/292, 396 R, 397, 287

(56) References Cited

U.S. PATENT DOCUMENTS 4,686,365 A * 8/1987 Meek et al. ................ 250/281
4,771,172 A 9/1988 Weber-Grabau et al.
5,107,109 A 4/1992 Stafford, Jr. et al.
5,300,774 A 4/1994 Buttrill, Jr.
5,468,957 A 11/1995 Franzen
5,572,022 A 11/1996 Schwartz et al.
5,747,800 A 5/1998 Yano et al.
6,080,985 A 6/2000 Welkie et al.
6,294,790 B1 * 9/2001 Weinberger ................. 250/397
2002/0063205 A1 * 5/2002 Green et al. ................ 250/281
2003/0111597 A1 * 6/2003 Gonin et al. ................ 250/287

FOREIGN PATENT DOCUMENTS

EP 905743 3/1999
EP 1215711 A2 * 6/2002 ........... H01J/49/40
JP 63-279555 11/1988
JP 04-066862 3/1992
JP 2000-048764 4/2000
JP 2000-082439 5/2000
JP 2000-277050 10/2000
WO WO98/50941 11/1998

OTHER PUBLICATIONS

Stoffels et al., Intl. J. Mass Spectrom. and Ion Phys. , "An Ion Detecting and Measuring System with Wide Dynamic Range" vol. 28, pp 159–169, 1978.

Yost et al., 35th ASMS Conference on Mass Spectrometry and Allied Topics. "Picogram to Microgram Analysis by Gas Chromatography/Ion Trap Mass Spectrometry", pp 789–790, May 24–29, 1987.

* cited by examiner

*Primary Examiner*—John R. Lee
*Assistant Examiner*—Bernard E. Souw
(74) *Attorney, Agent, or Firm*—Diederiks & Whitelaw PLC

(57) ABSTRACT

A way of increasing the dynamic range of a mass spectrometer which incorporates a time to digital converter such as commonly used with a time of flight mass analyser is disclosed. A z-lens upstream of the analyser can be switched between a high sensitivity mode wherein a beam of ions passing therethrough is substantially focused on to the entrance slit of the analyser, and a low sensitivity mode wherein the beam of ions is defocused so that the diameter of the beam substantially exceeds that of the entrance slit of the analyser. Obtaining data in the low sensitivity mode in combination with obtaining data in the high sensitivity mode enable an order of magnitude increase in the dynamic range to be obtained.

23 Claims, 4 Drawing Sheets

MASS SPECTROMETER AND METHODS OF MASS SPECTROMETRY

BACKGROUND OF THE INVENTION

1. Field of the Invention

The present invention relates to mass spectrometers and methods of mass spectrometry.

2. Discussion of the Prior Art

Various types of mass spectrometers are known which use a mass analyser which incorporates a time to digital converter ("TDC") also known as an ion arrival counter. Time to digital converters are used, for example, in time of flight mass analysers wherein packets of ions are ejected into a field-free drift region with essentially the same kinetic energy. In the drift region, ions with different mass-to-charge ratios in each packet of ions travel with different velocities and therefore arrive at an ion detector disposed at the exit of the drift region at different times. Measurement of the ion transit-time therefore determines the mass-to-charge ratio of that particular ion.

Currently, one of the most commonly employed ion detectors in time of flight mass spectrometers is a single ion counting detector in which an ion impacting a detecting surface produces a pulse of electrons by means of, for example, an electron multiplier. The pulse of electrons is typically amplified by an amplifier and a resultant electrical signal is produced. The electrical signal produced by the amplifier is used to determine the transit time of the ion which struck the detector by means of a time to digital converter which is started once a packet of ions is first accelerated into the drift region. The ion detector and associated circuitry is therefore able to detect a single ion impacting onto the detector.

However, such ion detectors exhibit a certain dead-time following an ion impact during which time the detector cannot respond to another ion impact. A typical detector dead time may be of the order of 1–5 ns. If during acquisition of a mass spectrum ions arrive during the detector dead-time then they will consequently fail to be detected, and this will have a distorting effect on the resultant mass spectra.

It is known to use dead time correction software to correct for distortions in mass spectra. However, software correction techniques are only able to provide a limited degree of correction. Even after the application of dead time correction software, ion signals resulting in more than one ion arrival on average per pushout event at a given mass to charge value will result in saturation of the ion detector and hence result in a non-linear response and inaccurate mass determination.

This problem is particularly accentuated with gas chromatography and similar mass spectrometry applications because of the narrow chromatographic peaks which are typically presented to the mass spectrometer which may be, for example, 2 seconds wide at the base.

Known time of flight mass spectrometers therefore suffer from a limited dynamic range especially in certain particular applications.

It is therefore desired to provide an improved mass spectrometer and methods of mass spectrometry.

The mass spectrometer according to the preferred embodiment enables the dynamic range of the detector to be extended. In particular, it is possible to alternate between two or more sensitivity ranges during an acquisition. One range is tuned to have a high sensitivity. A second range is adjusted to be at a lower sensitivity than the first range by a factor of up to×100. Preferably, the difference in sensitivity between the first and second sensitivity modes is at least a factor ×10, ×20, ×30, ×40, ×50, ×60, ×70, ×80, ×90 or ×100.

Exact mass measurements can be made using a single point lock mass common to both high and low sensitivity ranges.

Although in the preferred embodiment the sensitivity is changed by the operation of a z-lens, other embodiments are also contemplated wherein in a more general arrangement, the ion optical system between the ion source and the mass analyser is altered or changed so that ions passing therethrough are focused/defocused thereby altering the ion transmission efficiency. It is possible to change the ion transmission efficiency by a number of methods, including: (i) altering a y-focusing lens, which may be an Einzel lens; (ii) altering a z-focusing lens, which may be an Einzel lens; (iii) using a stigmatic focusing lens, preferably having a circular aperture, which focuses/defocuses an ion beam in both the y- and z-directions; and (iv) using a dc quadrupole lens which can focus/defocus in the y-direction and/or the z-direction as desired.

Utilising z-focusing is preferred to other ways of altering the ion transmission efficiency since it has been found to minimise any change in resolution, mass position and spectral skew which otherwise seem to be associated with focusing/deflecting the ion beam in the y-direction. However, in less preferred embodiments the ion beam may be altered in the y-direction either instead of the z-direction or in addition to the z-direction.

At least an order of magnitude increase in the dynamic range can be achieved with the preferred embodiment. It has been demonstrated that the dynamic range can be extended from about 3.25 orders of magnitude to about 4.25 orders of magnitude with a GC (gas chromatography) peak width of about 1.5 s at half height.

Preferably, the ion source is a continuous ion source. Further preferably, the ion source is selected from the group comprising: (i) an electron impact ("EI") ion source; (ii) a chemical ionisation ("CI") ion source; and (iii) a field ionisation ("FI") ion source. All these ion sources may be coupled to a gas chromatography (GC) source. Alternatively, and particularly when using a liquid chromatography (LC) source either an electrospray or an atmospheric pressure chemical ionisation ("APCI") ion source may be used.

Preferably, the mass analyser comprises a time to digital converter.

Preferably, the mass analyser is selected from the group comprising: (i) a quadrupole mass analyser; (ii) a magnetic sector mass analyser; (iii) an ion trap mass analyser; and (iv) a time of flight mass analyser, preferably an orthogonal acceleration time of flight mass analyser.

Preferably, the mass spectrometer further comprises control means arranged to alternately or otherwise regularly switch the z-lens, or more generally the ion optics, back and forth between at least first and second modes. In this embodiment, two data streams are stored as two discrete functions presenting two discrete data sets. Once the ratio of the high sensitivity to low sensitivity data has been determined, the data can be used to yield linear quantitative calibration curves over four orders of magnitude. Furthermore, the system can be arranged so that exact mass data can be extracted from either trace. Therefore, if a particular eluent produces a mass spectral peak which is saturated in the high sensitivity data set and therefore exhibits poor mass measurement accuracy, the same mass spectral peak may be unsaturated and correctly mass measured in the lower sensitivity trace. By using a combination of both traces, as a sample elutes exact mass measurements may be produced over a wide range of sample concentration.

The relative dwell times in the high and low sensitivity modes may either be the same, or in one embodiment more time may be spent in the higher sensitivity mode than in the lower sensitivity mode. For example, the relative time spent in a high sensitivity mode compared with a low sensitivity mode may be at least 50:50, 60:40, 70:30, 80:20, or 90:10. In other words, at least 50%, 60%, 70%, 80% or 90% of the time may be spent in the higher sensitivity mode compared with the lower sensitivity mode.

Alternatively, the control means may be arranged to switch the z-lens, or more generally the ion optics, from the first mode to the second mode when the detector is approaching or experiencing saturation and/or to switch the z-lens, or more generally the ion optics, from the second mode to the first made when a higher sensitivity is possible without the detector substantially saturating in the first mode. According to the preferred embodiment, low mass peaks may be ignored in the determination of whether or not to switch sensitivities and in one embodiment it is only if mass peaks falling within a specific mass to charge range (e.g. in/z ≧50, or 75, or 100) saturate or approach saturation that the control means switches sensitivity modes. Additionally/alternatively to ignoring saturation of low mass peaks and concentrating on mass peaks in one or more specific mass ranges (which are, preferably predefined, but in less preferred embodiments do not necessarily need to be), the control means may switch sensitivity modes based upon whether specific, preferably predetermined mass peaks are approaching saturation or are saturated, or if an unproved mass spectrum including that specific mass peak could be obtained by switching to a different sensitivity mode.

Preferably, the mass spectrometer further comprises a power supply capable of supplying from −100 to +100V dc to the z-lens. In one embodiment, the z-lens may be a three part Einzel lens wherein the front and rear electrodes are maintained at substantially the same dc voltage, e.g. for positive ions around −40V dc, and an intermediate electrode may be varied, for positive ions, from approximately −100V dc in the high sensitivity (focusing) mode anywhere up to approximately +100V dc in the low sensitivity (defocusing) mode. For example, in the low sensitivity mode a voltage of −50V dc, +0V dc, +25V dc, +50V dc or +100V dc may be applied to the central electrode.

Preferably, when the z-lens defocuses a beam of ions passing through the z-lens, the beam of ions is diverged to have a profile or area which substantially exceeds the profile or area of an entrance aperture to the mass analyser by at least a factor×2, ×4, ×10, ×25, ×50, ×75, or ×100.

Preferably, in the first mode at least 85%, 90%, 95%, 96%, 97%, 98%, 99% or substantially 100% of the ions are arranged to pass through the entrance aperture.

Preferably, in the second mode less than or equal to 15%, 10%, 5%, 4%, 3%, 2%, or 1% of the ions are arranged to pass through the entrance aperture.

According to one embodiment, the ion optical system is arranged and adapted to be operated in at least three different sensitivity modes. In yet further embodiments four, five, six etc. up to practically an indefinite number of sensitivity modes may be provided.

BRIEF DESCRIPTION OF THE DRAWINGS

Various embodiments of the present invention will now be described, by way of example only, and with reference to the accompanying drawings in which:

FIG. 2(*b*) shows an additional side view of the mass spectrometer of FIG. 2(*a*);

DETAILED DESCRIPTION OF A PREFERRED EMBODIMENT

Figure 1:
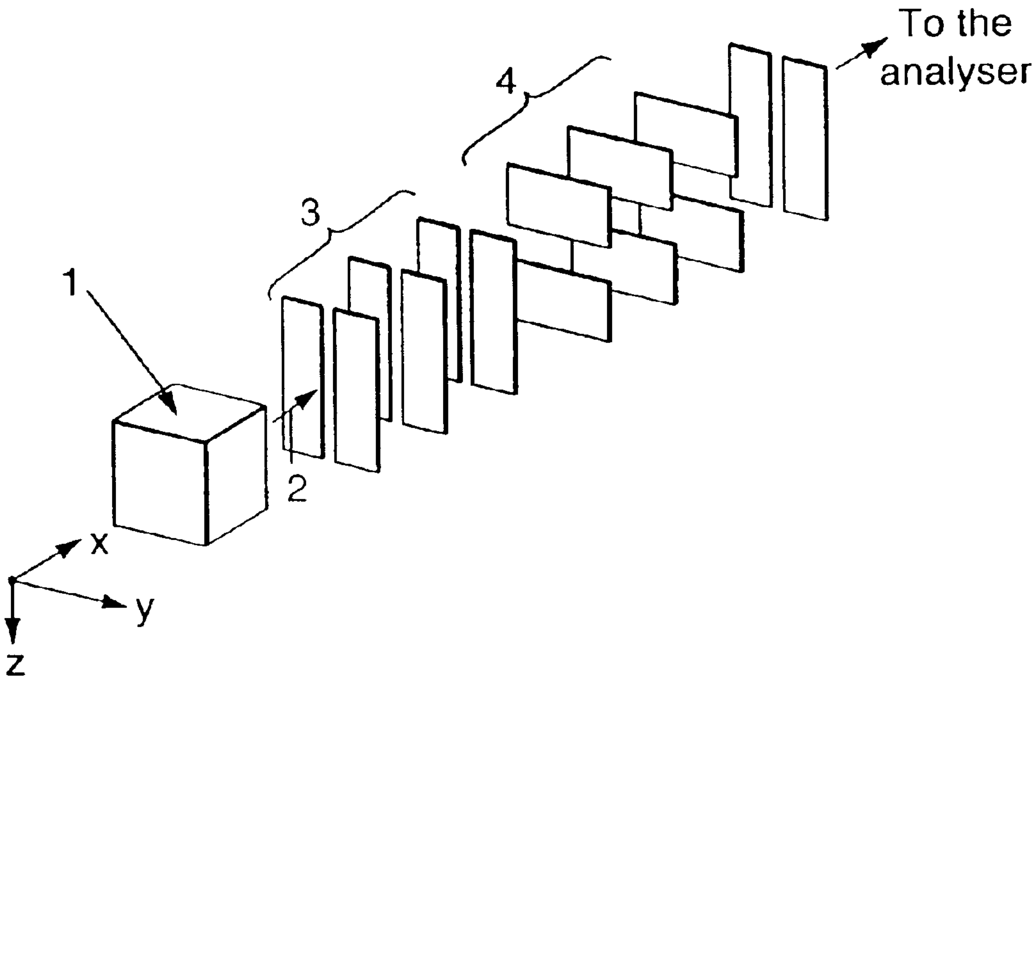
FIG. 1 shows an arrangement of y-focusing lenses and a z-lens upstream of a mass analyser.

A preferred embodiment of the present invention will now be described. FIG. 1 shows an ion source 1, preferably an electron impact or chemical ionisation ion source. An ion beam 2 emitted from the ion source 1 travels along an axis commonly referred to as the x-axis. The ions in the beam 2 are focused in a first y-direction as shown in the Figure by y-focusing and collimating lenses 3. A z-lens 4, preferably downstream of the y-lens 3, is arranged to deflect or focus the ions in a second z-direction which is perpendicular to both the first y-direction and to the x-axis. The z-lens 4 may comprise a number of electrodes, and may in one embodiment comprise an Einzel lens wherein the front and rear electrodes are maintained at substantially the same fixed dc voltage, and the dc voltage applied to an intermediate electrode may be varied to alter the degree of focusing/defocusing of an ion beam 2 passing therethrough. An Einzel lens may also be used for the y-lens 3. In less preferred arrangements, either a z-lens 4 or a y-lens 3 (but not both) may be provided.

Figure 2A:
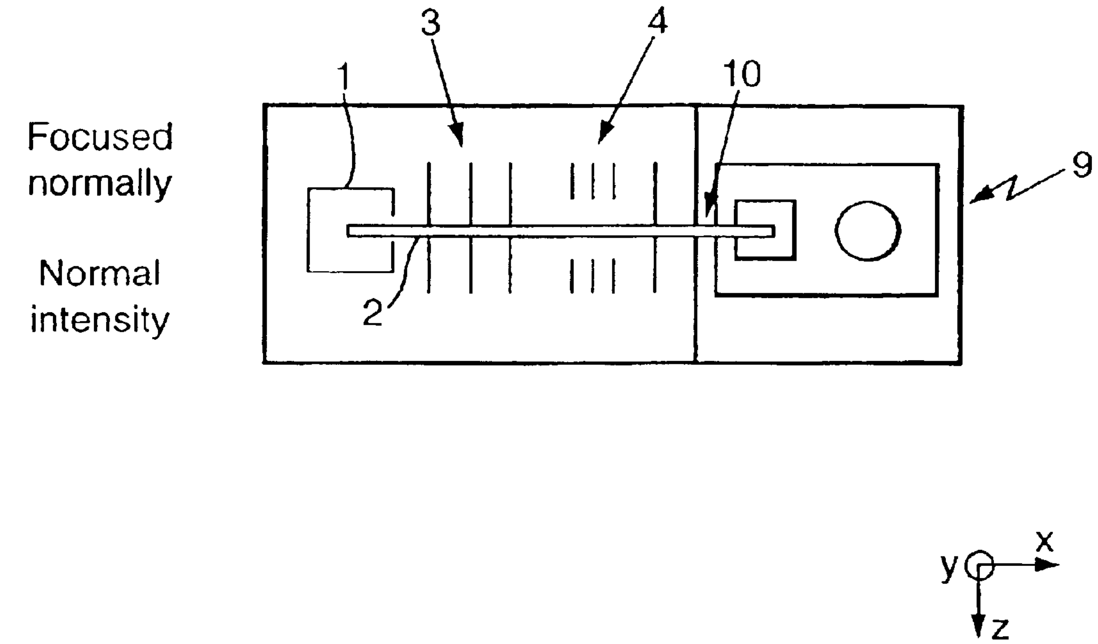
FIG. 2(*a*) shows a side view of a mass spectrometer according to a preferred embodiment.
Figure 2B:
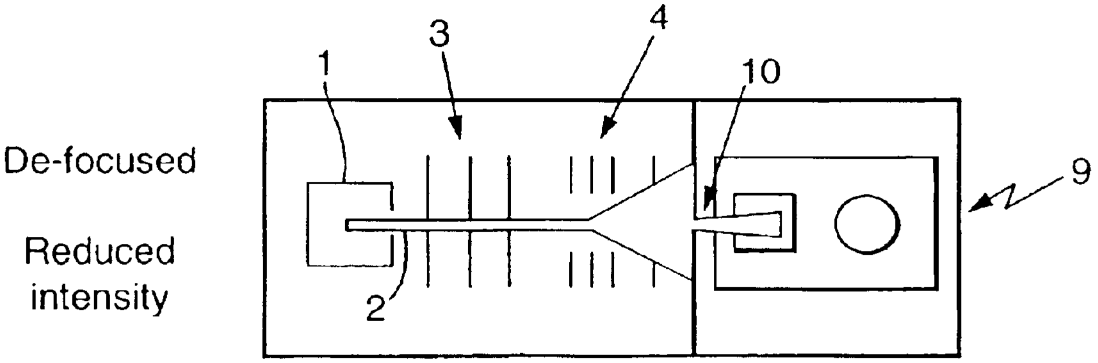

FIGS. 2(*a*) and (*b*) show side views of a mass spectrometer. In FIG. 2(*a*) the beam of ions 2 emitted from an ion source 1 is shown passing through the y-focusing and collimating lens 3. The z-lens 4 operating in a first (higher sensitivity) mode focuses the beam 2 substantially within the acceptance area and acceptance angle of an entrance slit 10 of the mass analyser 9 so that a substantial proportion of the ions (i.e. normal intensity) subsequently enter the analyser 9 which is positioned downstream of the entrance slit 10.

FIG. 2(*b*) shows the z-lens 4 operating in a second (lower sensitivity) mode wherein the z-lens 4 defocuses the beam of ions 2 so that the beam of ions 2 has a much larger diameter or area than that of the entrance slit 10 to the mass analyser 9. Accordingly, a much smaller proportion of the ions (i.e. reduced intensity) will subsequently enter the analyser 9 in this mode of operation compared with the mode of operation shown in FIG. 2(*a*) since a large percentage of the ions will fall outside of the acceptance area and acceptance angle of the entrance slit 10.

Figure 3:
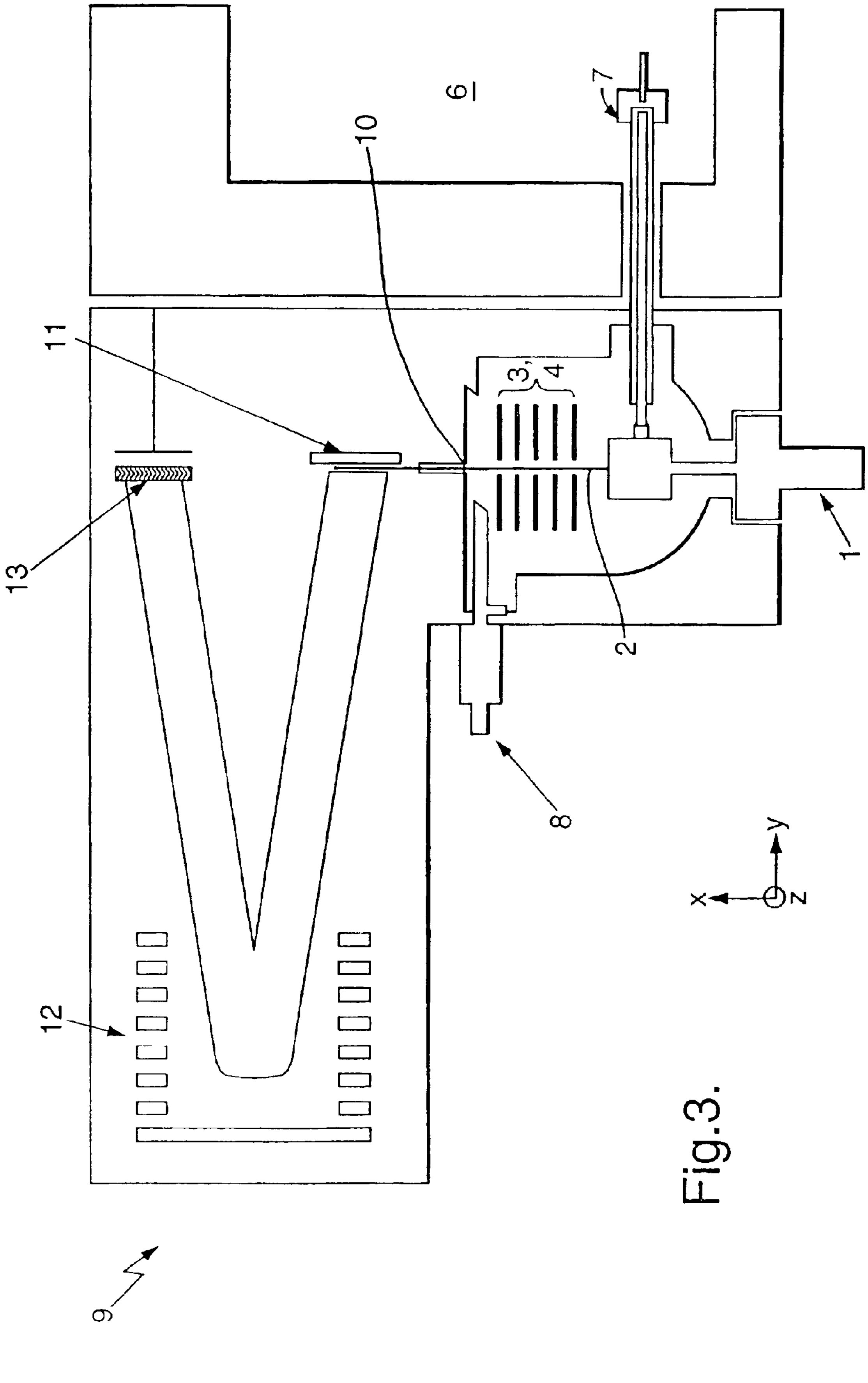
FIG. 3 shows a plan view of a mass spectrometer coupled to a gas chromatograph.

FIG. 3 shows a plan view of a preferred embodiment. A removable ion source 1 is shown together with a gas chromatography interface or reentrant tube 7 which communicates with a gas chromatography oven 6. A lock mass inlet is typically present but is not shown. A beam of ions 2 emitted by the ion source 1 passes through lens stack and collimating plates 3,4 which includes a switchable z-lens 4. The z-focusing lens 4 is arranged in a field free region of the optics and is connected to a fast switching power supply capable of supplying from −100 to +100V DC. With positive ions, −100V dc will focus an ion beam 2 passing therethrough and a more positive voltage, e.g. up to +100V dc, will substantially defocus a beam of ions 2 passing therethrough and thereby reduce the intensity of the ions entering the analyser 9.

Initially, the system may be tuned to full (high) sensitivity. The z-focusing lens voltage may then be varied, preferably manually, until the desired lower sensitivity is reached. In one embodiment, acquisition then results in fast switching of the z-lens power supply between two (or more) predetermined voltages so as to repetitively switch between high and low sensitivity modes of operation. High and low sensitivity spectra may be stored as separate functions to be post processed. In an alternative embodiment, the z-lens 4 only switches between higher and lower sensitivity modes (and vice versa) when either the detector 13 is being saturated in one mode or the sensitivity can be improved in another mode without saturation.

Downstream of ion optics 3,4 is an automatic pneumatic isolation valve 8. The beam of ions 2 having passed through ion optics 3,4 then passes through an entrance slit or aperture 10 into the analyser 9. Packets of ions are then injected into the drift region of the preferably orthogonal acceleration time of flight mass analyser 9 by pusher plate 11. Packets of ions are then preferably reflected by reflectron 12. The ions contained in a packet are temporally separated in the drift region and are then detected by detector 13 which preferably incorporates a time to digital converter in its associated circuitry.

Figure 4:
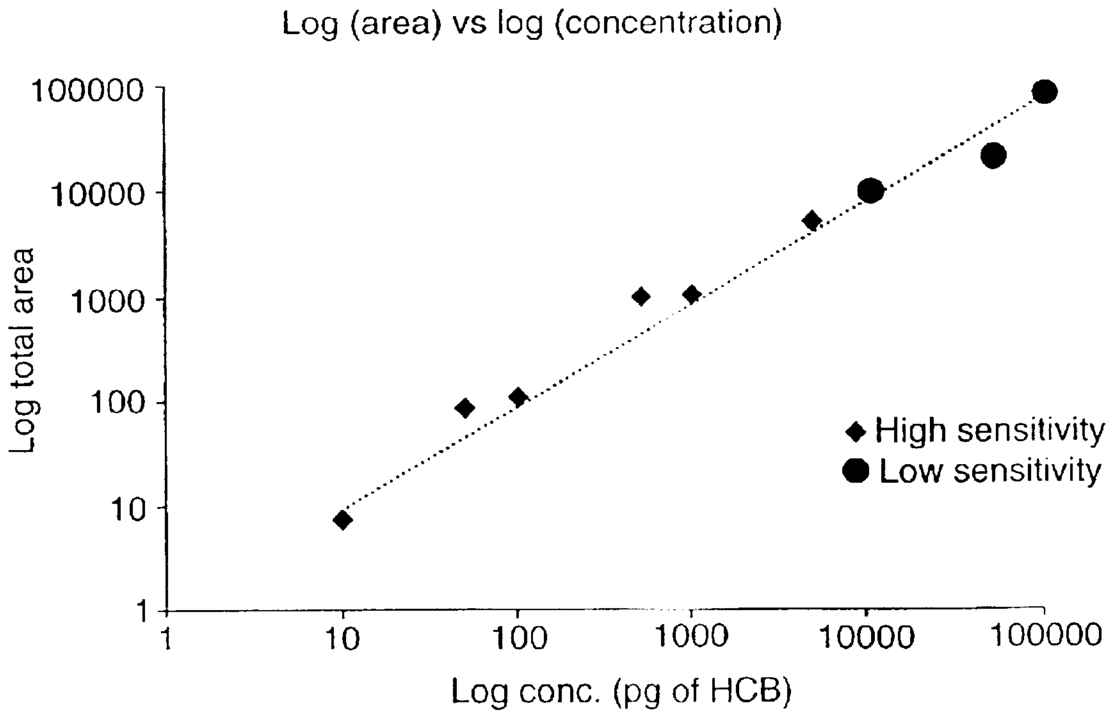
FIG. 4 shows experimental data illustrating the extended dynamic range which is achievable with the preferred embodiment.

FIG. 4 shows experimental data illustrating that the dynamic range can be extended from about 3.25 orders of magnitude to about 4.25 orders of magnitude (for a GC peak width of 1.5 s at half height) using a combination of data from both the high and low sensitivity data sets. In this particular case, the system was tuned to give a ratio of approximately 80:1 between the high and low sensitivity data sets. The experiment allowed equal acquisition time for both data sets by alternating between the two sensitivity ranges between spectra.

Standard solutions ranging in concentration from 10 pg to 100 ng of HCB (Hexachlorobenzene) were injected via the gas chromatograph. The peak area response (equivalent to the ion count) for the reconstructed ion chromatogram of mass to charge ratio 283.8102 was plotted against the concentration. The results from the low sensitivity data set were multiplied by ×80 before plotting to normalise them to the high sensitivity data set.

Although described with respect to a preferred embodiment of the invention, it should be readily understood that various changes and/or modifications can be made to the invention without departing from the spirit thereof. Instead, the invention is only intended to be limited by the scope of the following claims.

What is claimed is:

1. A mass spectrometer comprising:

an ion source;

a lens downstream of said ion source; and a mass analyser downstream of said lens, said mass analyser comprising an ion detector;

wherein said lens is regularly switched back and forth between a first high sensitivity mode of operation wherein said lens focuses a beam of ions and a second low sensitivity mode of operation wherein said lens substantially defocuses a beam of ions.

2. A mass spectrometer as claimed in claim 1, wherein said lens comprises a y-focusing lens.

3. A mass spectrometer as claimed in claim 1, wherein said lens comprises a z-focusing lens.

4. A mass spectrometer as claimed in claim 1, wherein said lens comprises an Einzel lens comprising a front, intermediate and rear electrode, with said front and rear electrodes being maintained, in use, at substantially the same DC voltage and said intermediate electrode being maintained at a different voltage to said front and rear electrodes.

5. A mass spectrometer as claimed in claim 4, wherein said front and rear electrodes are maintained, in use, at between −30 to −50V DC for positive ions, and said intermediate electrode is switchable from a voltage in said first high sensitivity mode of −80V DC to a voltage ≧+0V DC in said second low sensitivity mode.

6. A mass spectrometer as claimed in claim 1, further comprising a power supply capable of supplying from −100 to +100V DC to said lens.

7. A mass spectrometer as claimed in claim 1, wherein said lens is selected from the group consisting of: (i) a stigmatic focusing lens; and (ii) a DC quadrupole lens.

8. A mass spectrometer as claimed in claim 1, wherein in said second low sensitivity mode a beam of ions is diverged to have a profile which substantially exceeds an entrance aperture to said mass analyser.

9. A mass spectrometer as claimed in claim 1, wherein, in said first high sensitivity mode, at least 85% of ions in a beam of ions are arranged to pass through an entrance aperture to said mass analyser.

10. A mass spectrometer as claimed in claim 1, wherein in said second low sensitivity mode less than or equal to 15% of ions in a beam of ions are arranged to pass through an entrance aperture to said mass analyser.

11. A mass spectrometer as claimed in claim 1, wherein, in said first high sensitivity mode, greater than 60% of ions fall within the entrance acceptance profile of said mass analyser and wherein, in said second low sensitivity mode, less than 40% of ions fall within the entrance acceptance profile of said mass analyser.

12. A mass spectrometer as claimed in claim 1, wherein the difference in sensitivity between said first high sensitivity mode and said second low sensitivity mode is at least ×10.

13. A mass spectrometer as claim in claim 1, wherein said ion source is a continuous ion source.

14. A mass spectrometer as claimed in claim 13, wherein said ion source is selected from the group consisting of: (i) an Electron Impact ("EI") ion source; (ii) a Chemical lonisation ("CI") ion source; and (iii) a Field lonisation ("FI") ion source.

15. A mass spectrometer as claimed in claim 14 wherein said ion source is coupled to a gas chromatograph.

16. A mass spectrometer as claimed in claim 13, wherein said ion source is selected from the group consisting of: (i) an electrospray ion source; and (ii) an Atmospheric Pressure Chemical lonisation ("APCI") source.

17. A mass spectrometer as claimed in claim 16, wherein said ion source is coupled to a liquid chromatograph.

18. A mass spectrometer as claimed in claim 1, wherein said mass analyser comprises a Time to Digital Converter.

19. A mass spectrometer as claimed in claim 1, wherein said mass analyser is selected from the group consisting: (i) a quadrupole mass analyser, (ii) a magnetic sector mass analyser; (iii) an ion trap mass analyser; (iv) a Time of Flight mass analyser, and (v) an orthogonal acceleration Time of Flight mass analyser.

20. A mass spectrometer as claimed in claim 1, wherein said mass spectrometer spends substantially the same amount of time in said first high sensitivity mode as in said second low sensitivity mode.

21. A mass spectrometer as claimed in claim 1, wherein said mass spectrometer spends substantially more time in said first high sensitivity mode than in said second low sensitivity mode.

22. A mass spectrometer as claimed in claim 1, wherein said lens is arranged to automatically switch between at least three different sensitivity modes.

23. A method of mass spectrometry comprising:

providing an ion source;

providing a lens downstream of said ion source; and providing a mass analyser downstream of said lens, said mass analyser comprising an ion detector; and regularly switching back and forth said lens between a first high sensitivity mode of operation wherein said lens focuses a beam of ions and a second low sensitivity mode of operation wherein said lens substantially defocuses a beam of ions.

* * * * *